United States Patent
Jonas

(10) Patent No.: US 7,200,602 B2
(45) Date of Patent: Apr. 3, 2007

(54) DATA SET COMPARISON AND NET CHANGE PROCESSING

(75) Inventor: Jeffrey James Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 10/361,069

(22) Filed: Feb. 7, 2003

(65) Prior Publication Data
US 2004/0162802 A1  Aug. 19, 2004

(51) Int. Cl.
G06F 17/30 (2006.01)

(52) U.S. Cl. .......................... 707/101; 707/3; 707/10; 707/201; 707/203; 707/102; 707/103 Y; 707/104.1

(58) Field of Classification Search .................... 707/3, 707/10, 1, 101, 203, 204, 6, 7, 102, 205, 707/4, 100, 103 Y, 104.1, 201; 713/100, 713/194; 348/239; 382/181, 154; 705/10
See application file for complete search history.

(56) References Cited

U.S. PATENT DOCUMENTS

| | | | |
|---|---|---|---|
| 1,261,167 A | | 4/1918 | Russell |
| 5,010,478 A | | 4/1991 | Deran |
| 5,229,764 A | | 7/1993 | Matchett et al. |
| 5,403,639 A | * | 4/1995 | Belsan et al. ............... 707/204 |
| 5,454,101 A | * | 9/1995 | Mackay et al. ................. 707/3 |
| 5,534,855 A | | 7/1996 | Shockley et al. |
| 5,555,409 A | * | 9/1996 | Leenstra et al. ............ 707/101 |
| 5,560,006 A | | 9/1996 | Layden et al. |
| 5,608,907 A | | 3/1997 | Fehskens et al. |
| 5,659,731 A | * | 8/1997 | Gustafson ...................... 707/4 |
| 5,675,785 A | | 10/1997 | Hall et al. |
| 5,758,343 A | | 5/1998 | Vigil et al. |

(Continued)

FOREIGN PATENT DOCUMENTS

EP  1130513 A2  9/2001

(Continued)

OTHER PUBLICATIONS

International Search Report from PCT/US03/35607, dated Apr. 24, 2004.

(Continued)

Primary Examiner—Thuy N. Pardo
(74) Attorney, Agent, or Firm—Gates & Cooper LLP

(57) ABSTRACT

A method and system for comparing and analyzing a first set of data with a second set of data received by a computer while maintaining a persistent key is disclosed. The method and system comprising the step of receiving a first data set and a second data set, each data set comprising at least one record, where each record reflects at least one of a plurality of entities. In this regard, more than one record may reflect the same entity (e.g., an entity representing a specific person). The method, program and system further comprises the step of utilizing an algorithm to compare the second data set to at least a portion of the first data set; identify or assign a persistent key (and perhaps the same persistent key for records reflecting the same entity) for each record in the second data set; and create a database or file (i.e., a journal).

66 Claims, 2 Drawing Sheets

Process Algorithm 20

U.S. PATENT DOCUMENTS

| | | | |
|---|---|---|---|
| 5,764,977 | A | 6/1998 | Oulid-Aissa et al. |
| 5,781,911 | A | 7/1998 | Young et al. |
| 5,784,464 | A | 7/1998 | Akiyama et al. |
| 5,794,246 | A | 8/1998 | Sankaran et al. |
| 5,799,309 | A | 8/1998 | Srinivasan |
| 5,819,263 | A | 10/1998 | Bromley et al. |
| 5,878,416 | A | 3/1999 | Harris et al. |
| 5,933,831 | A | 8/1999 | Jorgensen |
| 5,991,408 | A | 11/1999 | Pearson et al. |
| 5,991,733 | A | 11/1999 | Aleia et al. |
| 5,991,758 | A | 11/1999 | Ellard |
| 5,991,765 | A | 11/1999 | Vethe |
| 5,995,097 | A | 11/1999 | Tokumine et al. |
| 5,995,973 | A | 11/1999 | Daudenarde |
| 6,014,670 | A | 1/2000 | Zamanian et al. |
| 6,032,158 | A | 2/2000 | Mukhopadhyay et al. |
| 6,035,295 | A | 3/2000 | Klein |
| 6,035,300 | A | 3/2000 | Cason et al. |
| 6,035,306 | A | 3/2000 | Lowenthal et al. |
| 6,041,410 | A | 3/2000 | Hsu et al. |
| 6,044,378 | A | 3/2000 | Gladney |
| 6,049,805 | A | 4/2000 | Drucker et al. |
| 6,052,693 | A | 4/2000 | Smith et al. |
| 6,058,477 | A | 5/2000 | Kusakabe et al. |
| 6,065,001 | A | 5/2000 | Ohkubo et al. |
| 6,073,140 | A * | 6/2000 | Morgan et al. ............. 707/203 |
| 6,076,167 | A | 6/2000 | Borza |
| 6,092,199 | A | 7/2000 | Dutcher et al. |
| 6,122,641 | A | 9/2000 | Williamson et al. |
| 6,122,757 | A | 9/2000 | Kelley |
| 6,160,903 | A | 12/2000 | Hamid et al. |
| 6,167,517 | A | 12/2000 | Gilchrist et al. |
| 6,185,557 | B1 | 2/2001 | Liu |
| 6,189,016 | B1 | 2/2001 | Cabrera et al. |
| 6,208,990 | B1 | 3/2001 | Suresh et al. |
| 6,249,784 | B1 * | 6/2001 | Macke et al. ................... 707/3 |
| 6,272,495 | B1 | 8/2001 | Hetherington |
| 6,317,834 | B1 | 11/2001 | Gennaro et al. |
| 6,334,132 | B1 * | 12/2001 | Weeks ........................ 707/101 |
| 6,339,775 | B1 | 1/2002 | Zamanian et al. |
| 6,357,004 | B1 * | 3/2002 | Davis ........................ 713/100 |
| 6,385,604 | B1 | 5/2002 | Bakalash et al. |
| 6,418,450 | B2 | 7/2002 | Daudenarde |
| 6,446,210 | B1 | 9/2002 | Borza |
| 6,460,037 | B1 | 10/2002 | Weiss et al. |
| 6,684,334 | B1 * | 1/2004 | Abraham .................... 713/194 |
| 6,690,820 | B2 * | 2/2004 | Lees et al. .................. 382/154 |
| 6,697,947 | B1 | 2/2004 | Matyas, Jr. et al. |
| 6,810,405 | B1 * | 10/2004 | LaRue et al. ............... 707/201 |
| 6,819,797 | B1 * | 11/2004 | Smith et al. ................ 382/181 |
| 6,968,338 | B1 * | 11/2005 | Gawdiak et al. ............ 707/100 |
| 2002/0023088 | A1 * | 2/2002 | Thwaites ...................... 707/10 |
| 2003/0030733 | A1 * | 2/2003 | Seaman et al. ............. 348/239 |
| 2003/0097380 | A1 * | 5/2003 | Mulhern et al. ............ 707/200 |
| 2003/0191739 | A1 * | 10/2003 | Chatterjee et al. .............. 707/1 |
| 2004/0019518 | A1 * | 1/2004 | Abraham et al. ............. 705/10 |
| 2004/0162802 | A1 * | 8/2004 | Jonas ............................. 707/1 |

FOREIGN PATENT DOCUMENTS

| WO | 9914692 A1 | 3/1999 |
|---|---|---|

OTHER PUBLICATIONS

Winkler et al., *The State of Record Linkage and Current Research Problems*.

Winkler et al., Advanced Methods for Record Linkage.

Jaro, "Record Linkage Research and the Calibration of Record Linkage Algorithms", U.S. Bureau of the Census, Report No: rr-84/27 (Aug. 9, 1984).

DeWitt et al., *An Evaluation of Non-Equijoin Algorithms*, Proc. 17th Intl. Conf. on Very Large Data Bases, Sep. 1991, pp. 443-452.

Li et al., *Skew Handling Techniques in Sort-Merge Join*.

Verykios et al., *A Bayesian decision model for cost optimal record matching*, The VLDB Journal, 2000, vol. 12, Nos. 28-450, pp. 28-40.

van den Bercken et al., *The Bulk Index Join: A Generic Approach to Processing Non-Equijoins*.

Monge, *Matching Algorithms within a Duplicate Detection System*.

Yuwono et al., *Search and Ranking Algorithms for Locating Resources on the World Wide Web*, Intl. Conf. on Data Engineering, 1996, pp. 164-171.

Hou et al., *Medical Image Retrieval by Spatial Features*, 1992 IEEE Intl. Conf. on Systems, Man and Cybernetics, Oct. 1992, vol. 1, pp. 1364-1369.

Callan et al., *Searching Distributed Collections With Inference Networks*, Proc. 18th Annual Intl. ACM SIGIR Conf. on R&D in Information Retrieval, Jul. 9-13, 1995, pp. 21-28.

DeFazio et al., *Integrating IR and RDBMS Using Cooperative Indexing*, Proc. 18th Annual Intl. ACM SIGIR Conf. on R&D in Information Retrieval, Jul. 9-13, 1995, pp. 84-92.

Sclaroff et al., *ImageRover: A Content-Based Image Browser for the World Wide Web*, IEEE Workshop on Content-Based Access of Image and Video Libraries, Jun. 1997, pp. 2-9.

Knoblock, *Searching the World Wide Web*, Trends & Controversies, Jan.-Feb. 1997, pp. 8-24.

Amba et al., *Automatic Linking of Thesauri*, Proc. 18th Annual Intl. ACM SIGIR Conf. on R&D in Information Retrieval, Jul. 9-13, 1995, pp. 181-188.

Gelbart et al., *Toward a Comprehensive Legal Information Retrieval System*, Database and Expert Systems Applns., Proc. Intl. Conf. in Vienna, Austria, 1990, pp. 121-125.

Kimoto et al., *Construction of a Dynamic Thesaurus and Its Use for Associated Information Retrieval*, Proc. 13th Intl. Conf. on R&D in Information Retrieval, Sep. 5-7, 1990, pp. 227-241.

Findler, *Information Retrieval Systems*, An Artificial Intelligence Technique for Information and Fact Retrieval, 1991.

Yearwood et al., *Retrieving cases for treatment advice in nursing using text representation and structured text retrieval*, Artificial Intelligence in Medicine, Jan. 1997, vol. 9, no. 1, pp. 79-98.

Batory et al., *Implementation Concepts for an Extensible Data Model and Data Language*, acm Transactions on Database Systems, Sep. 1988, vol. 13, No. 3, pp. 231-262.

Haisten, *Designing a Data Warehouse*, InfoDB, vol. 9, No. 2, pp. 2-9.

Labio et al., *The WHIPS Prototype for Data Warehouse Creation and Maintenance*, 1997, pp. 557-559.

Haisten, *Information Discovery in the Data Warehouse*, InfoDB, vol. 9, No. 6, pp. 14-25.

Suardi et al., *Execution of Extended Multidatabase SQL*, 1993, pp. 641-650.

Romberg, *Meta-Entities Keeping Pace with Change*, Database Programming & Design, Jan. 1995, pp. 54-59.

Fellegi, *Tutorial on the Fellegi-Sunter Model for Record Linkage*, Section ll: Overview of Applications and Introduction to Theory, pp. 127-178.

Crane et al., "Project LINK-LINK: An Interactive Database of Administrative Record Linkage Studies", National Center for Education Statistics and U.S. Department of Agriculture, Record Linkage Techniques —1985: Proceedings of the Workshop on Exact Matching Methodologies, Arlington, VA, pp. 311-315 (May 9-10, 1985).

Childers et al., *The IRS/Census Direct Match Study—Final Report*, Bureau of the Census—Statistical Research Division Report Series, Aug. 1, 1984, pp. 1-22.

LaPlant Jr., *Generalized Data Standardization Program Generator (GENSTAN) Program Generation System Part ll*, Bureau of the Census Statistical Research Division Report Series, Jul. 22, 1986.

LaPlant Jr., *User's Guide for the Generalized Record Linkage Program Generator (GENLINK) SRD Program Generator System User's Guide: Part lll*, Bureau of the Census Statistical Research Division Report Series, Sep. 1, 1986.

Winkler et al., *An Application of the Fellegi-Sunter Model of Record Linkage to the 1990 U.S. Decennial Census*.

Winkler, *Matching and Record Linkage*.

Scheuren et al., *Recursive Merging and Analysis of Administrative Lists and Data*.
Winkler, *Record Linkage Software and Methods for Merging Administrative Lists*.
Wang et al., *Automatically Detecting Deceptive Criminal Identities*.
Hernandez, *A Generalization of Band Joins and the Merge/Purge Problem*, IEEE Trans. on Knowledge and Data Engineering, 1996.
Lu et al.,*Piplined Band Join in Shared-Nothing Systems,* Proc. 1995 Asian Computing Science Conf., Dec. 1995, pp. 239-253.
Beebe, "Why are Epidemiologists Interested in Matching Algorithms?", National Cancer Institute, Record Linkage Techniques—1985: Proceedings of the Workshop on Exact Matching Methodologies, Arlington, VA, pp. 139-143 (May 9-10, 1985).
Boruch et al., "Exact Matching of Micro Data Sets in Social Research: Benefits and Problems", Record Linkage Techniques—1985: Proceedings of the Workshop on Exact Matching Methodologies, Arlington, VA, pp. 145-153 (May 9-10, 1985).
Scheuren, "Methodlolgic Issues in Linkage of Multiple Data Bases", National Academy of Sciences, Panel on Statistics for an Aging Population (Sep. 13, 1985), reprinted Record Linkage Techniques—1985: Proceedings of the Workshop on Exact Matching Methodologies, Arlington, VA, pp. 155-178 (May 9-10, 1985).
Winkler, "Processing of Lists and String Comparison", Energy Information Administration, Record Linkage Techniques—1985: Proceedings of the Workshop on Exact Matching Methodologies, Arlington, VA, pp. 181-187 (May 9-10, 1985).
Jaro, "Current Record Linkage Research", U.S. Bureau of the Census, Record Linkage Techniques—1985: Proceedings of the Workshop on Exact Matching Methodologies, Arlington, VA, pp. 317-320 (May 9-10, 1985).
Smith, "Record-Keeping and Data Preparation Practices to Facilitate Record Linkage", Statistics Canada, Record Linkage Techniques—1985: Proceedings of the Workshop on Exact Matching Methodologies, Arlington, VA, pp.321-326 (May 9-10, 1985).
Hill et al., "Generalized Iterative Record Linkage System", Statistics Canada, Record Linkage Techniques—1985: Proceedings of the Workshop on Exact Matching Methodologies, Arlington, VA, pp. 327-333 (May 9-10, 1985).
Howe et al., "A Generalized Iterative Record Linkage Computer System for Use in Medical Follow-up Studies", Computers and Biomedical Research 14, pp. 327, 240 (1981).
Lee, Joon Ho, "Combining Multiple Evidence from Different Properties of Weighting Schemes", Proceedings of the 18th Annual International ACM SIGIR Conference on Research and Development in Information Retrieval, Seattle, Washington, USA (Jul. 9-Jul. 13, 1995) pp. 180-188.
International Search Report for PCT/US04/03465, dated Apr. 7, 2005.
DeWitt et al., *An Evaluation of Non-Equijoin Algorithms,* Proc. 17th Intl. Conf. on Very Large Data Bases, Sep. 1991, pp. 443-452.
Li et al., *Skew Handling Techniques in Sort-Merge Join.*
van den Bercken et al., *The Bulk Index Join*: A Generic Approach to Processing Non-Equijoins.
Hou et al., *Medical Image Retrieval by Spatial Features,* 1992 IEEE Intl. Conf. on Systems, Man and Cybernetics, Oct. 1992, vol. 1, pp. 1364-69.
DeFazio et al., *Integrating IR and RDBMS Using Cooperative Indexing,* Proc. 18th Annual Intl. ACM SIGIR Conf. on R&D in Information Retrieval, Jul. 9-13, 1995, pp. 84-92.
Knoblock, *Searching the World wide Web,* Trends & Controversies, Jan.-feb. 1997, pp. 8-24.
Amba et al., *Automatic Linking of Thesauri,* Proc. 18th Annual Intl. ACM SIGIR Conf. on R&D in Information Retrieval, Jul. 9-13, 1995, pp. 181-188.
Labio et al., *The WHIPS Prototype for Data Warehouse Creation and Maitenance,* 1997, pp. 557-559.
Childers et al., *The IRS/Census Direct Match Study - Final Report,* Bureau of the Census - Statistical Research Division Report Series, Aug. 1, 1984, pp. 1-22.
LaPlant Jr., *Generalized Data Standardization Program Generator (Genstan) Program Generation System Part II,* Bureau of the Census Statistical Research Division Report Series, Jul. 22, 1986.
Lu et al., *Pipelined Band Join in Shared-Nothing Systems,* Proc. 1995 Asian Computing Science Conf., Dec. 1995, pp. 239-253.
Beebe, "Why are Epidemiologists Interested in Matching Algorithms? ", National Cancer Institute, Record Linkage Techniques - 1985: Proceedings of the Workshop on Exact Matching Methodologies, Arlington, VA, pp. 139-143 (May 9-10, 1985).
Scheuren, "Methodologic Issues in Linkage of Multiple Data Bases", National Academy of Sciences, Panel on Statistics for an Aging Population (Sep. 13, 1985), reprinted Record Linkage Techniques - 1985: Proceedings of the Workshop on Exact Matching Methodologies, Arlington, VA, pp. 155-178 (May 9-10, 1985).

* cited by examiner

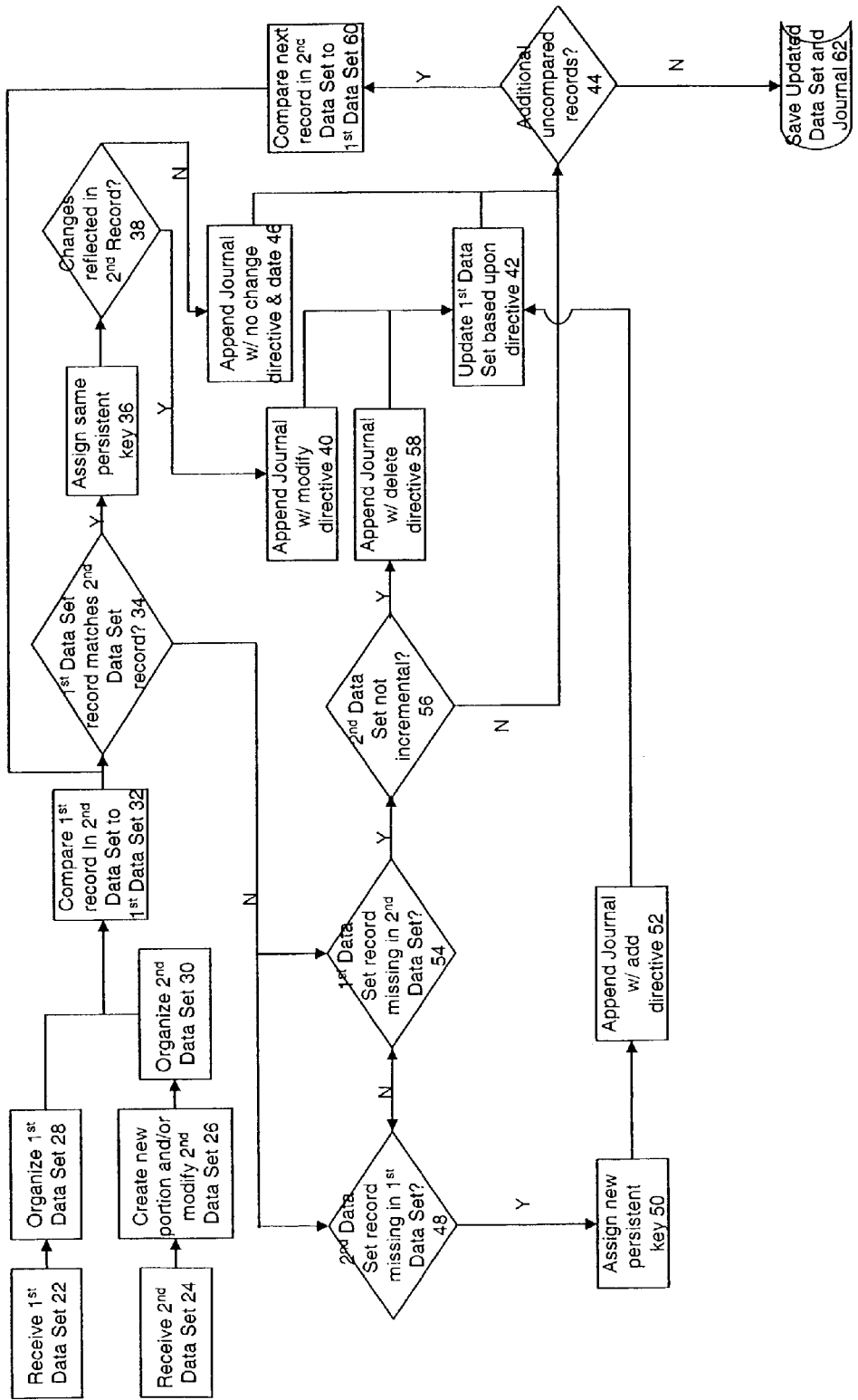
Figure 2 – Process Algorithm 20

DATA SET COMPARISON AND NET CHANGE PROCESSING

CROSS-REFERENCE TO RELATED APPLICATIONS

None.

FEDERALLY SPONSORED OR DEVELOPMENT

Not Applicable.

TECHNICAL FIELD

This invention generally relates to the comparison between two records, sets or batches of data and the efficient determination of any additions, modifications and/or deletions, and more particularly, to a system, method and software for comparing and analyzing a first set of data with a second set of data received by a computer while maintaining a persistent key.

BACKGROUND OF THE INVENTION

Databases and data warehouses are computer-based data structures designed to allow the storing and querying of records which are typically received from one or more sources. The records generally correspond with entities, such as individuals, organizations and property. In certain cases, a database system is confronted with a situation wherein a new set of data may be substantially duplicative of a data set previously submitted to the system. Furthermore, the new data set may include a certain amount, even a small amount, of additions, modifications or deletions when compared with the previously submitted data set. Processing largely redundant sets of data misuses valuable system resources and presents significant scalability issues.

For example, a previously submitted data set may contain all the telephone residential listings of a particular geographic area. Thereafter, perhaps monthly or semiannually, the system may receive a new set of data that comprises a more recent set of either all or part of the telephone residential listings of the particular geographic area. Processing the new highly duplicative data set, at a minimum, will not identify records deleted from the more recent set and will require the intended recipient(s) to process substantially more data than necessary.

It is contemplated by the present invention that identifying or assigning a persistent key corresponding to each record could be used to facilitate efficient processing and identification of each record by the intended recipient(s) of the data set. For example, telephone residential listings do not contain a persistent key for each record. Therefore, any comparison in current systems is based upon the entire record or some combination of data in the record, such as last name, first name, telephone number and/or address. Occasionally, one record or many records in a data set may be different from a previously submitted data set, such as when a postal office splits a zip code. In such a case, a persistent key facilitates more efficient processing by the intended recipient(s) by enabling the intended recipient(s) to update the affected record(s) based upon the persistent key, thus minimizing the processing required to initially identify the affected record(s).

Unfortunately, current systems do not have an efficient way to compare two data sets and determine the additions, deletions or modifications between the two data sets while maintaining a persistent key. This includes, without limitation, an efficient way for generating a log representing a subset of such additions, deletions or modifications for further review, analysis and/or reporting with the respective persistent key.

The present invention is provided to address these and other issues.

SUMMARY OF THE INVENTION

It is an object of the invention to provide a method, program and system for processing data to compare two sets of data. The invention is implemented through a computer which may be connected to one or more additional computers in a network.

In one embodiment, the method, program and system comprises the step of receiving a first data set and a second data set, each data set comprising at least one record, where each record reflects at least one of a plurality of entities. In this regard, more than one record may reflect the same entity (e.g., an entity representing a specific person). The method, program and system further comprises the step of utilizing an algorithm to: (a) compare the second data set to at least a portion of the first data set; (b) identify or assign a persistent key (and perhaps the same persistent key for records reflecting the same entity) for each record in the second data set; and (c) create a database or file (i.e., a journal) to include any records: (i) in the second data set that: (1) do not exist in the first data set (perhaps with an "add" directive representing additions and the identified or assigned persistent key), (2) include at least one change to at least one record in the first data set (perhaps with a "modify" directive representing modifications and the identified or assigned persistent key), and/or (3) perhaps do not include at least one change to at least one record in the first data set, but reflects the identical one of a plurality of entities as a record in the first data set with a date (perhaps with a "no change" directive representing that the same record in the first data set was submitted in the second data set); and/or (ii) in the first data set that do not exist in the second data set, perhaps: (1) with a "delete" directive representing deletions and the identified persistent key and (2) only if the second data set is not incremental (e.g, only last month's changes, rather than a complete data set) of the at least a portion of the first data set.

The data contained in the first and second data sets preferably represents a plurality of entities. However, in some cases, each data set may include one or more records pertaining to a single (i.e., the same) entity. The entities can be individuals, property, organizations, or other identifying items that can be represented by identifying data.

The step of utilizing an algorithm may include, prior to comparing the second data set to the at least a portion of the first data set, at least one of: (a) creating a new portion of the second data set, (b) modifying at least a portion of the second data set and/or (c) organizing the second data set for efficient comparison, including, without limitation: (i) sorting the second data set, (ii) utilizing a database structure (e.g., a database with an index) and/or (iii) utilizing a memory array. It is yet further contemplated that the step of modifying at least a portion of the second data set may include removing or replacing a portion of the second data set meeting a user-defined criterion, such as removing or replacing characters contained within a record which are identified to be inappropriate.

It is yet further contemplated that the step of utilizing an algorithm further comprises: (a) organizing the at least a portion of the first data set for efficient comparison prior to comparing the second data set to the at least a portion of the first data, including, without limitation: (i) sorting the first data set, (ii) utilizing a database structure (e.g., a database with an index) and/or (iii) utilizing a memory array and/or (b) modifying the first data set to reflect the second data set (with the identified or assigned persistent keys). In this manner, the first data set may reflect the last known data set.

It is yet further contemplated that the step of utilizing an algorithm to compare the second data set and the at least a portion of the first data set includes determining whether at least one record in the: (a) second data set: (i) does not exist in the first data set or (ii) includes at least one change to at least one record in the at least a portion of the first data set that is determined to reflect an identical one of the plurality of entities or (b) at least a portion of the first data set does not exist in the second data set.

It is yet further contemplated that the step of utilizing an algorithm to identify or assign a persistent key includes assigning the same persistent key that was previously identified or assigned to a record in the at least a portion of the first data set to at least one record in the second data set when the at least one record in the second data set is determined to reflect an identical one of the plurality of entities (e.g., the same person).

In a second embodiment, the method, program and system comprises the steps of: (a) receiving a first data set having a first record, (b) assigning a persistent key to the first record, (c) receiving a second data set having a second record, (d) comparing the second record to the first record, and (e) recording an entry in a journal pertaining to the comparison of the second record to the first record. It is yet further contemplated that the second embodiment further comprises the step of: (a) assigning a persistent key to the second record identical to the persistent key assigned to the first record if the second record matches (e.g., reflects an identical entity, but does not necessarily contain identical data) the first record, and/or (b) assigning a persistent key different from the persistent key assigned to the first record if the second record does not match the first record.

It is yet further contemplated that the step of recording an entry in a journal includes recording: (a) a changed second record entry in the journal if the second record matches the first record and includes changes to information contained in the first record (perhaps with a "modify" directive), (b) the persistent key and date (reflecting that the first record is identical to the second record) if the second record matches the first record and does not include changes to information contained in the first record (perhaps with a "no change" directive), and/or (c) the second record in the journal with an "add" directive if the second record does not match the first record.

It is yet further contemplated that the second embodiment further comprise the step of recording the first record in the journal with a "delete" directive if the first record does not match the second record and the second data set is not an incremental data set of the first data set.

It is yet further contemplated that: (a) the first data set includes a plurality of first records, (b) each of the first records represents one of a plurality of entities, (c) the second data set includes a plurality of second records and/or (d) the second embodiment further comprise the step of modifying: (i) the second data set prior to comparing the second record to the first record (e.g., creating new data and/or replacing existing data) and/or (ii) the first data set to reflect the second data set (with the assigned persistent key).

It is yet further contemplated that the second embodiment further comprise the steps of organizing: (a) the first data set for efficient comparison prior to comparing the second record to the first record and/or (b) the second data set for efficient comparison prior to comparing the second record to the first record.

These and other aspects and attributes of the present invention will be discussed with reference to the following drawings and accompanying specification.

BRIEF DESCRIPTION OF THE DRAWINGS

FIG. 2 is a flowchart of the Process Algorithm block in FIG. 1.

DETAILED DESCRIPTION OF THE INVENTION

Figure 1:
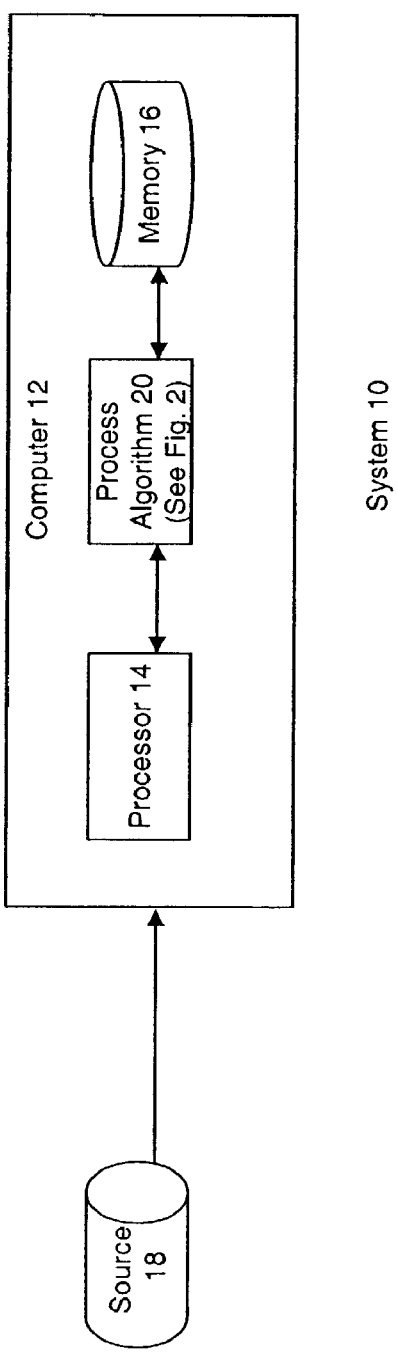
FIG. 1 is a functional block diagram of a system in accordance with the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

A data processing system 10 for processing data is illustrated in FIGS. 1–2. The system 10 includes at least one conventional computer 12 having a processor 14 and memory 16. The memory 16 is used both for storage of the executable software to operate the system 10 as well as for storage of the data sets and random access memory. However, the software can be stored or provided on any other computer readable medium, such as a CD, DVD or floppy disc. Additionally, the data sets can be stored entirely, or in part, in a database or memory that is external to the computer 12. The computer 12 may receive several inputs from a common channel source 18, which may emanate from one or multiple sources.

The system is configured to receive data sets from the source 18. The data sets comprise one or more records representing one or more entities. The entities may be individuals, organizations, property, proteins, chemical or organic compounds, biometric or atomic structures, or other items that can be represented by identifying data.

The system 10 utilizes an algorithm 20 to process a first data set 22 and a second data set 24 from the source 18. The algorithm 20 is stored in the memory 16 and is processed or implemented by the processor 14.

The first data set may represent a last known data set wherein each record has a persistent key that was identified or assigned prior to any comparison with the second data set. A persistent key is a unique numeric or alphanumeric identifier that, at a minimum, may be used to distinguish one or more records representing a particular entity from other records representing a different entity.

As illustrated in FIG. 2, the algorithm 20 receives the first data set (perhaps by loading a last known data set with previously identified or assigned persistent keys) 22 and the second data set 24 and creates a new portion of the second data set (e.g., enhances and/or supplements the second data set) and/or modifies the second data set 26 in accordance with a user-defined criterion, such as replacing characters that are determined to be bad or inappropriate with another known character, such as a "space" character. The first data set is then organized for efficient comparison 28 and the second data set is organized for efficient comparison 30. The second data set is then compared to all or a predetermined portion of the first data set by comparing the first record in the second data set to a record in the first data set 32.

If a record in the first data set ("First Record") matches (e.g., reflects an identical entity, but does not necessarily contain identical data) a record in the second data set ("Second Record") 34, the algorithm 20 assigns the Second Record the same persistent key 36 as that assigned to the matched First Record and determines whether the Second Record incorporates changes that are not reflected in the First Record 38. If the Second Record does incorporate changes that are not reflected in the First Record ("Changed Second Record"), the Changed Second Record is recorded in a separate file (such as a flat file or database, hereafter a "Journal") for identifying changes, no changes, additions and deletions with a "modify" directive 40 and the first data set is updated based upon the directive 42 by replacing the First Record with the Change Second Record (with persistent key and perhaps date/time stamp). The algorithm 20 then determines whether there are additional uncompared records 44.

If the Second Record does not incorporate changes, but is the same as the First Record ("Identical Record"), the algorithm 20 may record in the Journal a "no change" directive (with the persistent key) and a date representing that the Identical Record was submitted in the second data set 46. The algorithm 20 then determines whether there are additional uncompared records 44.

If a Second Record does not match a First Record 48, the Second Record is assigned a new persistent key 50 and recorded in the Journal with an "add" directive ("Add Record") 52. The first data set is then updated based upon the directive 42 by adding the Add Record with the persistent key to the first data set directly or indirectly (e.g., directly to the first data set, into a separate file or database which could be later merged with the first data set, and/or through the utilization of a memory array).

If a First Record does not match a Second Record and is missing in the second data set (an "Unmatched Record") 54, the algorithm 20 will determine whether the second data set is merely an incremental data set of the first data set 56 generally through instructions emanating from the source identifying the second data set as incremental or not incremental. If the second data set is not an incremental data set, the Unmatched Record is: (a) recorded in the Journal with a "delete" directive (with the persistent key) 58 and (b) the first data set is updated based upon the directive 42 by removing or marking for deletion the Unmatched Record from the first data set. The algorithm 20 then determines whether there are any additional uncompared records 44.

If there are additional uncompared records, the algorithm 20 would then compare the next record in the second data set to the first data set 60 and the process would be repeated. If there no additional uncompared records, the algorithm 20 would save the updated data set and the Journal 62.

Depending upon the end-user preference, the Journal could produce (perhaps for additional processing or analysis) a report, file and/or subset of data identifying: (a) all Changed Second Records that reflect records that modify certain records in the first data set, (b) all Identical Records that reflect records that were left unchanged, but have a more recent date corresponding with the second data set, (c) all Add Records that reflect records to be added to the first data set, and/or (d) all Unmatched Records that reflect records to be deleted from the first data set.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method for data set comparison and net change processing by a computer comprising the steps of:
   (a) receiving a first data set and a second data set, each of the data sets comprising at least one record reflecting at least one of a plurality of entities, the at least one record of the first data set having a persistent key; and
   (b) utilizing an algorithm to:
      (1) compare the second data set to at least a portion of the first data set;
      (2) identify or assign a persistent key of the first data set to a record in the second data set, if the record of the second data set matches the record of the first data set; and
      (3) create a journal database or file to include at least one entry reflecting the persistent key and at least one of:
         (i) at least one record in the second data set that is determined to not exist in the portion of the first data set;
         (ii) at least one record in the second data set that is determined to include at least one change to at least one record in the portion of the first data set reflecting an identical one of the plurality of entities; and
         (iii) at least one record in the portion of the first data set that is determined to not exist in the second data set.

2. The method of claim 1 wherein the one of a plurality of entities is at least one of people, personal property, real property, organizations, chemical compounds, organic compounds, proteins, biometric values and atomic structures.

3. The method of claim 1 wherein the step of utilizing an algorithm includes at least one of:
   creating a new portion of the second data set;
   modifying at least a portion of the second data set; and
   organizing the second data set for efficient comparison prior to comparing the second data set to the portion of the first data set.

4. The method of claim 3 wherein the step of modifying at least a portion of the second data set includes one of removing at least a portion of the second data set meeting a user-defined criterion and replacing at least a portion of the second data set meeting a user-defined criterion.

5. The method of claim 3 wherein the step of organizing the second data set for efficient comparison includes sorting the second data set.

6. The method of claim 3 wherein the step of organizing the second data set for efficient comparison includes utilizing a database structure.

7. The method of claim 3 wherein the step of organizing the second data set for efficient comparison includes utilizing a memory array.

8. The method of claim 1 wherein the step of utilizing an algorithm includes organizing the portion of the first data set for efficient comparison prior to comparing the second data set to the portion of the first data set.

9. The method of claim 1 wherein the step of utilizing an algorithm further comprises modifying the first data set to reflect the second data set.

10. The method of claim 1 wherein the step of utilizing an algorithm to compare the second data set and the portion of the first data set includes determining whether at least one record in the in the second data set: does not exist in the first data set; and includes at least one change to at least one record in the portion of the first data set that is determined to reflect an identical one of the plurality of entities; and at least a portion of the first data set does not exist in the second data set.

11. The method of claim 1 wherein the step of utilizing an algorithm to identify or assign a persistent key includes assigning a persistent key that was previously identified or assigned to a record in the portion of the first data set to at least one record in the second data set when the record in the second data set is determined to reflect the identical one of the plurality of entities.

12. The method of claim 1 wherein the step of utilizing an algorithm to create one of a journal database or file further includes: at least one record in the second data set that does not include a change to at least one record in the portion of the first data set reflecting an identical one of the plurality of entities; and a date.

13. The method of claim 12 wherein the step of utilizing an algorithm to create a journal database or file to include at least one entry comprising at least one record in the second data set that does not include a change to at least one record in the portion of the first data set reflecting an identical one of the plurality of entities; and a "no change" directive.

14. The method of claim 1 wherein the step of utilizing an algorithm to create a journal database or file to include at least one entry comprising at least one record in the second data set that is determined to not exist in the at least a portion of the first data set; and an "add" directive.

15. The method of claim 1 wherein the step of utilizing an algorithm to create a journal database or file to include at least one entry comprising at least one record in the second data set that is determined to include at least one change to at least one record in the portion of the first data set reflecting an identical one of the plurality of entities; and a "modify" directive.

16. The method of claim 1 wherein the step of utilizing an algorithm to create a journal database or file to include at least one entry comprising at least one record in the portion of the first data set that is determined to not exist in the second data set; and a "delete" directive.

17. The method of claim 16 wherein the step of utilizing an algorithm to create a journal database or file to include at least one entry comprising at least one record in the portion of the first data set that is determined to not exist in the second data set occurs only when the second data set is not determined to be an incremental data set of the portion of the first data set.

18. A method of data set comparison and net change processing by a computer comprising the steps of:
(a) receiving a first data set having a first record;
(b) assigning a persistent key to the first record;
(c) receiving a second data set having a second record;
(d) comparing the second record to the first record;
(e) assigning the persistent key of the first record to the second record if the second record matches the first record; and
(f) recording an entry in a journal pertaining to the comparison of the second record to the first record reflecting the persistent key and at least one of: (1) the second record in the second data set that is determined to not exist in the first data set: (2) the second record in the second data set that is determined to match the first record in the first data set and include at least one change to the first record in the first data set; and (3) the first rrecord in the first data set that is determined to not exist in the second data set.

19. The method of claim 18 further comprising the step of assigning a persistent key to the second record identical to the persistent key assigned to the first record if the second record matches the first record.

20. The method of claim 18 further comprising the step of assigning a persistent key different from the persistent key assigned to the first record if the second record does not match the first record.

21. The method of claim 18 wherein the step of recording an entry in a journal includes recording a changed second record entry in the journal if the second record matches the first record and includes changes to information contained in the first record.

22. The method of claim 21 wherein the step of recording an entry in a journal includes recording a "modify" directive in the journal if the second record matches the first record and includes changes to information contained in the first record.

23. The method of claim 18 wherein the step of recording an entry in a journal includes recording the persistent key and a date if the second record matches the first record and does not include changes to information contained in the first record.

24. The method of claim 23 wherein the step of recording an entry in a journal includes recording a "no change" directive in the journal if the second record matches the first record and does not include changes to information contained in the first record.

25. The method of claim 18 wherein the step of recording an entry in a journal includes recording the second record in the journal with an "add" directive if the second record does not match the first record.

26. The method of claim 18 wherein the step of recording an entry in a journal includes recording the first record in the journal with a "delete" directive if: the first record does not match the second record and the second data set is not an incremental data set of the first data set.

27. The method of claim 18 wherein the first data set includes a plurality of first records.

28. The method of claim 18 wherein the second data set includes a plurality of second records.

29. The method of claim 18 wherein the first record represents one of a plurality of entities.

30. The method of claim 18 further comprising the step of modifying the second data set prior to comparing the second record to the first record.

31. The method of claim 18 further comprising the step of organizing the second data set for efficient comparison prior to comparing the second record to the first record.

32. The method of claim 18 further comprising the step of organizing the first data set for efficient comparison prior to comparing the second record to the first record.

33. The method of claim 18 further comprising the step of modifying the first data set to reflect the second data set.

34. For a system for data set comparison and net change processing and a computer readable medium containing program instructions for execution by a computer for performing the method comprising the steps of:
(a) receiving a first data set and a second data set, each of the data sets comprising at least one record reflecting at least one of a plurality of entities, the records of the first data set having a persistent key; and
(b) utilizing an algorithm to:

(1) compare the second data set to at least a portion of the first data set;

(2) identify or assign a persistent key of a record of the first data set to a record in the second data set, if the record of the second data set matches the record of the first data set; and (3) create a journal database or file to include at least one entry reflecting the persistent key and at least one of:

(i) at least one record in the second data set that is determined to not exist in the portion of the first data set;

(ii) at least one record in the second data set that is determined to include at least one change to at least one record in the portion of the first data set reflecting an identical one of the plurality of entities; and (iii) at least one record in the portion of the first data set that is determined to not exist in the second data set.

35. The computer readable medium for performing the method of claim 34 wherein the one of a plurality of entities is at least one of people, personal property, real property, organizations, chemical compounds, organic compounds, proteins, biometric values and atomic structures.

36. The computer readable medium for performing the method of claim 34 wherein the step of utilizing an algorithm includes at least one of: creating a new portion of the second data set; modifying at least a portion of the second data set; and organizing the second data set for efficient comparison prior to comparing the second data set to the portion of the first data set.

37. The computer readable medium for performing the method of claim 36 wherein the step of modifying at least a portion of the second data set includes one of removing at least a portion of the second data set meeting a user-defined criterion and replacing at least a portion of the second data set meeting a user-defined criterion.

38. The computer readable medium for performing the method of claim 36 wherein the step of organizing the second data set for efficient comparison includes sorting the second data set.

39. The computer readable medium for performing the method of claim 36 wherein the step of organizing the second data set for efficient comparison includes utilizing a database structure.

40. The computer readable medium for performing the method of claim 36 wherein the step of organizing the second data set for efficient comparison includes utilizing a memory array.

41. The computer readable medium for performing the method of claim 34 wherein the step of utilizing an algorithm includes organizing the portion of the first data set for efficient comparison prior to comparing the second data set to the portion of the first data set.

42. The computer readable medium for performing the method of claim 34 wherein the step of utilizing an algorithm further comprises modifying the first data set to reflect the second data set.

43. The computer readable medium for performing the method of claim 34 wherein the step of utilizing an algorithm to compare the second data set and the portion of the first data set includes determining whether at least one record in the second data set: does not exist in the first data set; and includes at least one change to at least one record in the portion of the first data set that is determined to reflect an identical one of the plurality of entities; and at least a portion of the first data set does not exist in the second data set.

44. The computer readable medium for performing the method of claim 34 wherein the step of utilizing an algorithm to one of identify or assign a persistent key includes assigning a persistent key that was previously identified or assigned to a record in the portion of the first data set to at least one record in the second data set when the record in the second data set is determined to reflect the identical one of the plurality of entities.

45. The computer readable medium for performing the method of claim 34 wherein the step of utilizing an algorithm to create a journal database or file further includes: at least one record in the second data set that does not include a change to at least one record in the portion of the first data set reflecting an identical one of the plurality of entities; and a date.

46. The computer readable medium for performing the method of claim 45 wherein the step of utilizing an algorithm to create a journal database or file to include at least one entry comprising at least one record in the second data set that does not include a change to at least one record in the at least one record in the portion of the first data set reflecting an identical one of the plurality of entities; and a "no change" directive.

47. The computer readable medium for performing the method of claim 34 wherein the step of utilizing an algorithm to create a journal database or file to include at least one entry comprising at least one record in the second data set that is determined to not exist in the portion of the first data set; and an "add" directive.

48. The computer readable medium for performing the method of claim 34 wherein the step of utilizing an algorithm to create a journal database or file to include at least one entry comprising at least one record in the second data set that is determined to include at least one change to at least one record in the at least one record in the portion of the first data set reflecting an identical one of the plurality of entities; and a "modify" directive.

49. The computer readable medium for performing the method of claim 34 wherein the step of utilizing an algorithm to create journal a database or file to include at least one entry comprising at least one record in the portion of the first data set that is determined to not exist in the second data set; and a "delete" directive.

50. The computer readable medium for performing the method of claim 49 wherein the step of utilizing an algorithm to create a journal database or file to include at least one entry comprising at least one record in the portion of the first data set that is determined to not exist in the second data set occurs only when the second data set is not determined to be an incremental data set of the portion of the first data set.

51. For a system for data set comparison and net change processing and a computer readable medium containing program instructions for execution by a computer for performing the method comprising the steps of:

(a) receiving a first data set having a first record;

(b) assigning a persistent key to the first record;

(c) receiving a second data set having a second record;

(d) comparing the second record to the first record;

(e) assigning the persistent key of the first record to the second record if the second record matches the first record; and (f) recording an entry in a journal pertaining to the comparison of the second record to the first record reflecting the persistent key and at least one of: (1) the second record in the second data set that is determined to not exist in the first data set; (2) the second record in the second data set that is determined to match the first record in the first data set and include at least one change to the first record in the first data set; and (3) the first record in the first data set that is determined to not exist in the second data set.

52. The computer readable medium for performing the method of claim 51 further comprising the step of assigning a persistent key to the second record identical to the persistent key assigned to the first record if the second record matches the first record.

53. The computer readable medium for performing the method of claim 51 further comprising the step of assigning a persistent key different from the persistent key assigned to the first record if the second record does not match the first record.

54. The computer readable medium for performing the method of claim 51 wherein the step of recording an entry in a journal includes recording a changed second record entry in the journal if the second record matches the first record and includes changes to information contained in the first record.

55. The computer readable medium for performing the method of claim 54 wherein the step of recording an entry in a journal includes recording a "modify" directive in the journal if the second record matches the first record and includes changes to information contained in the first record.

56. The computer readable medium for performing the method of claim 51 wherein the step of recording an entry in a journal includes recording the persistent key and a date if the second record matches the first record and does not include changes to information contained in the first record.

57. The computer readable medium for performing the method of claim 56 wherein the step of recording an entry in a journal includes recording a "no change" directive in the journal if the second record matches the first record and does not include changes to information contained in the first record.

58. The computer readable medium for performing the method of claim 51 wherein the step of recording an entry in a journal includes recording the second record in the journal with an "add" directive if the second record does not match the first record.

59. The computer readable medium for performing the method of claim 51 wherein the step of recording an entry in a journal includes recording the first record in the journal with a "delete" directive if: the first record does not match the second record and the second data set is not an incremental data set of the first data set.

60. The computer readable medium for performing the method of claim 51 wherein the first data set includes a plurality of first records.

61. The computer readable medium for performing the method of claim 51 wherein the second data set includes a plurality of second records.

62. The computer readable medium for performing the method of claim 51 wherein the first record represents one of a plurality of entities.

63. The computer readable medium for performing the method of claim 51 further comprising the step of modifying the second data set prior to comparing the second record to the first record.

64. The computer readable medium for performing the method of claim 51 further comprising the step of organizing the second data set for efficient comparison prior to comparing the second record to the first record.

65. The computer readable medium for performing the method of claim 51 further comprising the step of organizing the first data set for efficient comparison prior to comparing the second record to the first record.

66. The computer readable medium for performing the method of claim 51 further comprising the step of modifying the first data set to reflect the second data set.

* * * * *